United States Patent
Kawada et al.

(10) Patent No.: US 8,897,937 B2
(45) Date of Patent: Nov. 25, 2014

(54) APPARATUS FOR CONTROLLING RAILCAR AND METHODS FOR DETECTING SYNCHRONOUS SLIDE/SLIP

(71) Applicants: Hisanosuke Kawada, Akashi (JP); Soichiro Bando, Akashi (JP); Hideaki Ezaki, Akashi (JP); Isao Suzumura, Yonkers, NY (US); Yuji Katsuyama, Tokyo (JP); Yoshiaki Wakabayashi, Tokyo (JP)

(72) Inventors: Hisanosuke Kawada, Akashi (JP); Soichiro Bando, Akashi (JP); Hideaki Ezaki, Akashi (JP); Isao Suzumura, Yonkers, NY (US); Yuji Katsuyama, Tokyo (JP); Yoshiaki Wakabayashi, Tokyo (JP)

(73) Assignees: Kawasaki Jukogyo Kabushiki Kaisha, Kobe-shi (JP); Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/706,759

(22) Filed: Dec. 6, 2012

(65) Prior Publication Data
US 2014/0163785 A1    Jun. 12, 2014

(51) Int. Cl.
*B60T 8/17* (2006.01)
*B60L 3/10* (2006.01)
*B61C 17/12* (2006.01)

(52) U.S. Cl.
CPC ..................................... *B61C 17/12* (2013.01)

USPC ................. 701/20; 701/19; 701/82; 180/197; 303/128; 303/22.6; 303/186

(58) Field of Classification Search
USPC ............ 701/20, 82, 90, 19, 70, 117, 29.3, 78, 701/79; 318/807, 802, 806, 376, 375, 381, 318/52, 197, 72; 180/197, 65.51, 65.1; 303/177, 139, 151, 20, 168, 128, 22.6, 303/133, 186; 246/167 R, 167 D, 168.1; 324/166; 361/238, 242
See application file for complete search history.

(56) References Cited

U.S. PATENT DOCUMENTS

| | | | | |
|---|---|---|---|---|
| 4,071,282 A | * | 1/1978 | Callahan et al. | 303/168 |
| 4,075,538 A | * | 2/1978 | Plunkett | 318/52 |
| 5,480,220 A | * | 1/1996 | Kumar | 303/151 |
| 7,064,507 B2 | * | 6/2006 | Donnelly et al. | 318/376 |
| 7,084,602 B2 | * | 8/2006 | Donnelly et al. | 318/807 |

FOREIGN PATENT DOCUMENTS

| | | |
|---|---|---|
| JP | A-61-199401 | 9/1986 |
| JP | A-11-070870 | 3/1999 |

\* cited by examiner

*Primary Examiner* — Marthe Marc-Coleman
(74) *Attorney, Agent, or Firm* — Oliff PLC

(57) ABSTRACT

A railcar control apparatus comprises a synchronous slide/slip detector which determines that the axles are synchronously sliding/slipping if an absolute value of axle's speed difference is less than a synchronous slide/slip speed difference threshold and an absolute value of axle's acceleration is greater than a predetermined synchronous slide/slip acceleration threshold.

16 Claims, 11 Drawing Sheets

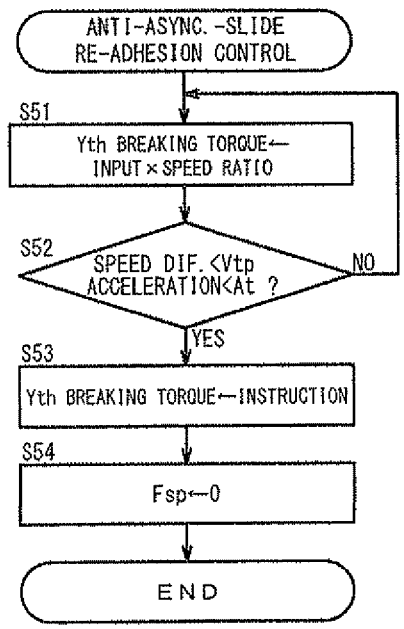

APPARATUS FOR CONTROLLING RAILCAR AND METHODS FOR DETECTING SYNCHRONOUS SLIDE/SLIP

FIELD OF THE INVENTION

The present invention relates to an apparatus for controlling a railcar. Also, the present invention relates to a method for detecting synchronous slide/slip of the railcar.

BACKGROUND OF THE INVENTION

The railcar has a plurality of axles each supporting at its opposite ends respective wheels running on the rails. Acceleration and deceleration of the railcar are accomplished by using adhesion, or frictional force, between the wheels and rails. The adhesion varies depending upon conditions such as wear and existence of water and/or dust at the contact surfaces between the wheels and rails. Also, the adhesion may vary with dynamic conditions between the wheels and rails such as slide/slip rate. For example, the adhesion increases with the increase of the slide/slip of the wheel against the rail. The adhesion, on the other hand, begins to decrease once it has exceeded an adhesion limit between the wheels and rails.

Accordingly, an application of a certain amount of braking or accelerating torque to the axles can cause differences in rotational speeds thereof due to the adhesion variation between the wheels and the rails. The axles with excessive slide/slip beyond the adhesion limit may result in a significant decrease in adhesion, which in turn causes further slide/slip of the wheels against the rails. The decrease in adhesion may result in that the wheels with sliding/slipping axles exert insufficient braking or accelerating forces between the wheels and rails.

To overcome this problem, there have been used various railcar controlling operations in which the sliding/slipping is detected and then the braking/accelerating torque for the axles associated with the sliding/slipping is decreased to eliminate the sliding/slipping.

Typically, it can be thought that, in the braking operation the increased rotational speed of the axle causes less sliding of the wheels to the rails while the decreased rotational speed causes more sliding of the wheels, and in the acceleration operation the decreased rotational speed of the axle causes less slipping of the wheels to the rails while the increased rotational speed causes more slipping of the wheels. Therefore, according to the conventional method, an assumption is made that the axle with the maximum rotational speed is not sliding in the braking operation while the axle with the minimum rotational speed is not slipping in the acceleration operation, and the maximum and the minimum rotational speeds are used as references in the determinations of the sliding and slipping in the braking and accelerating operations, respectively, in each of which it is determined that the axle is sliding/slipping if an absolute difference between the reference and the actual rotational speed of the axle is greater than a predetermined threshold.

Various conditions such as weight of railcar, characteristic of the motor/brake, and torque command may impose a limitation on the acceleration of the railcar. Then, conventionally the axle is determined to be sliding or slipping if the absolute rate of acceleration of the axle exceeds a threshold corresponding to the limited acceleration.

As described above, according to the conventional control of the railcar, it is determined that the axle is sliding or slipping if the absolute difference of rotational speed or the absolute rate of acceleration is greater than respective threshold and, if at least one of above conditions is true, the braking or accelerating torque applied to the axle is decreased in corresponding to the absolute rotational speed difference and the absolute acceleration rate difference to reduce the sliding or slipping and thereby to reproduce adhesions between the wheels and the rails.

According to the conventional control, however, the adhesion recovers gradually with the decrease in the speed in the same manner irrespective of whether all of or part of the axles are sliding or slipping, which takes relatively much time to recover the adhesion for each and every axle if all of the axles are sliding or slipping to a certain extent (hereinafter referred to as "synchronous sliding" and "synchronous slipping".)

JP 61-199401 A discloses a method for detecting of sliding, which comprises providing two thresholds of speed difference and acceleration, and determining that all the axles are sliding if at least one of the speed difference and acceleration of the axle is greater than its first threshold but less than its second threshold for more than a predetermined number of axles and also the speed and the acceleration of each axle are less than respective second thresholds. However, if all of the axles are sliding uniformly and synchronously, the acceleration increases beyond its second threshold while the speed difference remains less than its first threshold. Therefore, the method may be unable to detect the synchronous slide and, as a result, the adhesion is recovered individually for respective axles and then takes much time to complete the adhesion recovering process.

JP 11-70870 A discloses that not only the speed difference and the acceleration of the axle but also a differential value of acceleration is used in the determination of the sliding. This method, however, may not be able to detect the synchronous slide/slip, which means that recovering adhesions for all the axles takes a considerable time.

To solve those problems, the present invention provides railcar control apparatus for detecting synchronous slide/slip of the axles to reduce the slide/slip and a method for detecting synchronous slide/slip of the railcar.

SUMMARY OF THE INVENTION

Accordingly, an apparatus for controlling a railcar of the invention comprises a synchronous slide detector which is adapted to detect a synchronous slide in which all of axles are synchronously sliding at a braking operation of the railcar, or a synchronous slip detector which is adapted to detect a synchronous slip in which all of the axles are synchronously slipping at an accelerating operation of the railcar, or both. The synchronous slide detector is adapted so as to detect the synchronous slide if an absolute value of speed difference of all of the sliding axles being controlled is less than a first synchronous slide speed difference threshold and an absolute value of axle's negative acceleration value is greater than a first synchronous acceleration threshold. The synchronous slip detector is adapted to detect the synchronous slip if an absolute value of speed difference of all of the slipping axles being controlled is less than a second synchronous slip speed difference threshold and an absolute value of axle's positive acceleration value is greater than a second synchronous acceleration threshold.

BRIEF DESCRIPTION OF THE DRAWINGS

These and other embodiments are described in further detail in the following description related to the appended drawing figures.

FIG. 10 is flow chart showing an anti-asynchronous-slide re-adhesion control in FIG. 7;

DETAILED DESCRIPTION OF THE PREFERRED EMBODIMENTS

Figure 1:
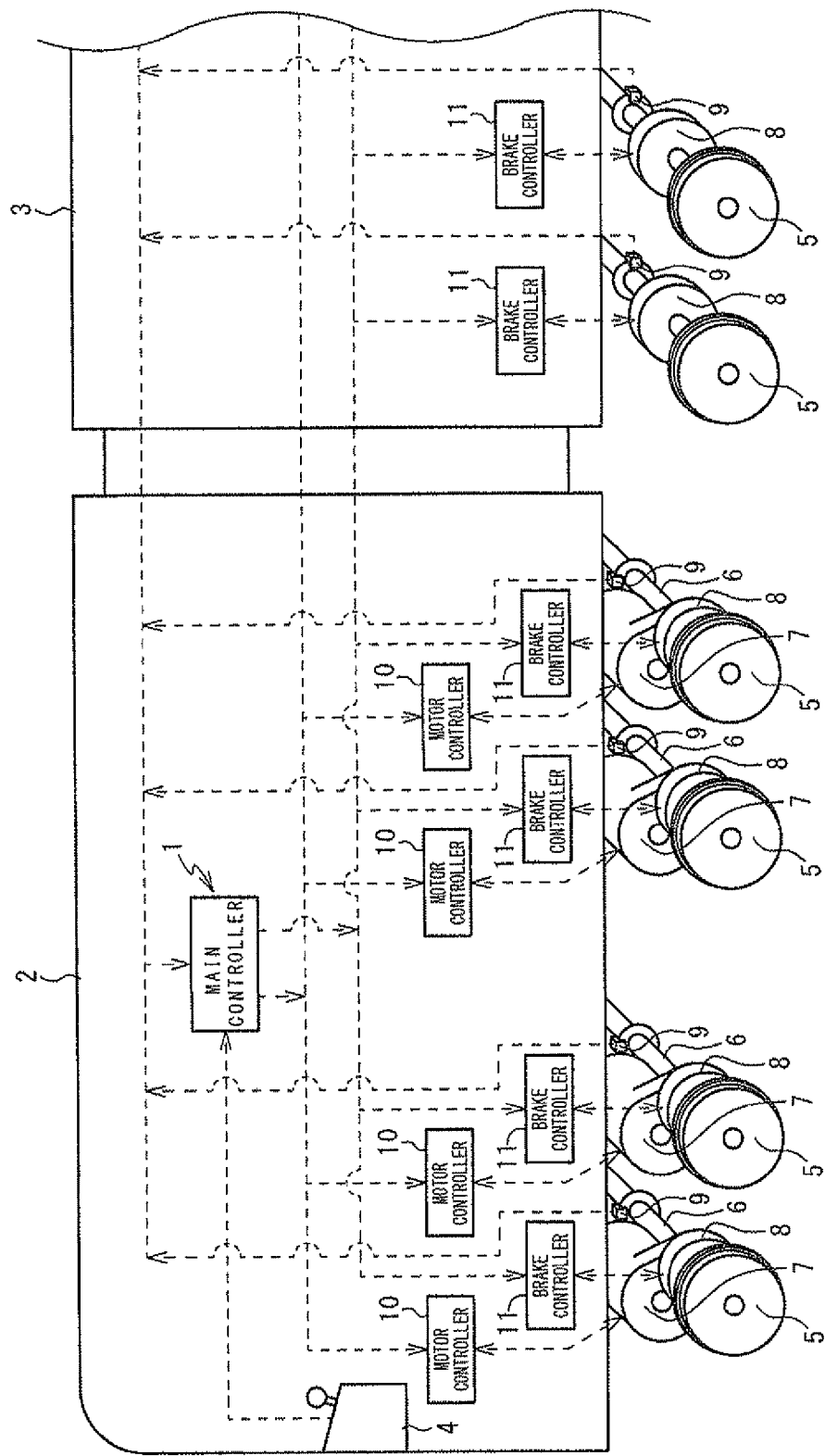
FIG. 1 is a diagram showing a schematic construction of railcar according to the embodiment of the invention.

FIG. 1 shows a general configuration of a railcar system according to an embodiment of the invention. The railcar system comprises a leading car 2 and a trailing car 3. The leading car 2 has a railcar control unit or main controller 1 mounted therein for performing various controls which will be described below. The leading car 2 is connected to the trailing car 3 which is adapted to be controlled by the main controller 1 in the leading car 2. Also, the leading car 2 comprises an operation desk 4 on which an operator works for the operations of the leading and trailing cars 2 and 3.

Each of the leading cars 2 and trailing cars 3 comprises a pair of bogies mounted on front and rear sides thereof in the longitudinal running direction. Each bogie comprises a bogie frame (not shown) and a pair of axles mounted on the front and rear sides thereof for supporting wheels 5 at opposite ends thereof. The leading car 2 comprises a motor 7, a brake 8, and a speed detector made of pulse generator 9 for the detection of the rotational speed of each axle 6. The trailing car 3 comprises a brake 8 and a pulse generator 9 for each axle 6. Also, the leading car 2 comprises motor controllers 10 for controlling rotations of respective motors 7 and brake controllers 11 for controlling respective brakes 8. The trailing car 3 comprises brake controllers 11 for controlling respective brakes 8. In this embodiment, each motor 7 serves as a drive unit for the rotational driving of the associated axle 6 and a regenerative brake unit for regenerative braking of the associated axle 6. The speed detector is not limited to the pulse generator 8 and any alternative detectors may be used therefor provided that they can detect the rotational speed of the axle 6. For example, an encoder may be used for this purpose.

In this embodiment, the drive units or motors are provided only in the leading car 2. Alternatively, the drive units or motors may be provided in the leading car 2, the trailing car 3, or both. Likewise, the operation desk 4 may be provided in the leading car 2, the trailing car 3, or both. For a serially connected railcar system, all the axles in the system may be designed to be controlled only at the operation desk of the leading car. Alternatively, the cars in such system may be divided into several groups in each of which the axles thereof are controlled at the controller in any of the cars included in that group.

According to the embodiment, at braking cars 2 and 3, the operator works on the operation desk 4 to transmit a signal into the main controller 1. In response to the signal, the main controller 1 transmits another signal to the motor controllers 10 and/or brake controllers 11, controlling respective motors 7 and brakes 8 to apply necessary driving/braking forces. The main controller 1 calculates a rotational speed and a rate of acceleration for each axle 6 according to a signal from the associated pulse generator 9. Using the rotational speed and the rate of acceleration, the main controller 1 performs anti-slide/slip controls to reduce sliding of the braking wheels 5 and slipping of the accelerating wheels 5.

According to the embodiment, the main controller 1 controls the braking operations of the motors 7 and brakes 8. Preferably, the braking forces from the motors 7 and the brake 8 are adjusted to be substantially the same by calibrations of the motor and brake controllers 10 and 11. This allows that the motors 7 and the brakes 8 have different performances.

Figure 2:
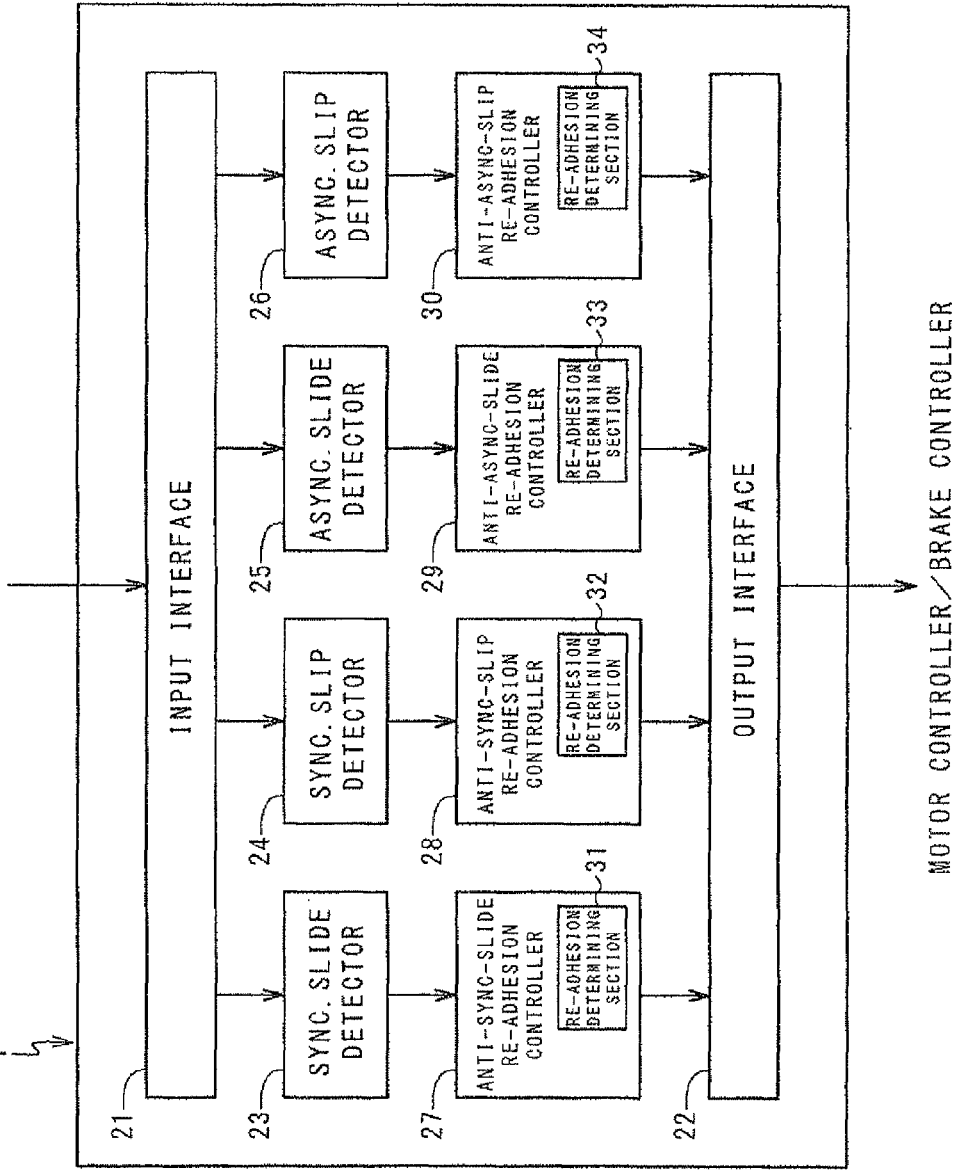
FIG. 2 is a block diagram showing a construction of a main controller in FIG. 1.

FIG. 2 shows a general configuration of the main controller 1. As shown, the main controller 1 comprises an input interface 21 for receiving detection signals from the pulse generators 9 and an output interface 22 for transmitting control signals to the motor controllers 10 and the brake controllers 11. The main controller 1 also comprises a synchronous slide detector 23, asynchronous slip detector 24, an asynchronous slide detector 25, an asynchronous slip detector 26, an anti-synchronous-slide re-adhesion controller 27, an anti-synchronous-slip re-adhesion controller 28, an anti-asynchronous-slide re-adhesion controller 29, and an anti-asynchronous-slip re-adhesion controller 30. Each of those controllers may not be a physical element and can be implemented as a part of computer program.

The input interface 21 is designed to calculate a rotational speed and an acceleration of each axle 6 according to the detection signal from the associated pulse generator 9 and to transmit the calculated speed and acceleration into the synchronous slide detector 23, the synchronous slip detector 24, the asynchronous slide detector 25, and the asynchronous slip detector 26. The anti-synchronous-slide re-adhesion controller 27, the anti-synchronous-slip re-adhesion controller 28, the anti-asynchronous-slide re-adhesion controller 29, and the anti-asynchronous-slip re-adhesion controller 30 output respective signals through the output interface 22 to the motor controllers 10 and/or the brake controllers 11.

The anti-synchronous-slide re-adhesion controller 27, the anti-synchronous-slip re-adhesion controller 28, the anti-asynchronous-slide re-adhesion controller 29, and the anti-asynchronous-slip re-adhesion controller 30 comprise re-adhesion determining sections 31, 32, 33, and 34, respectively, to determine whether the wheel 5 on the axle 5 being controlled has made a re-adhesion onto the rail.

Figure 3:
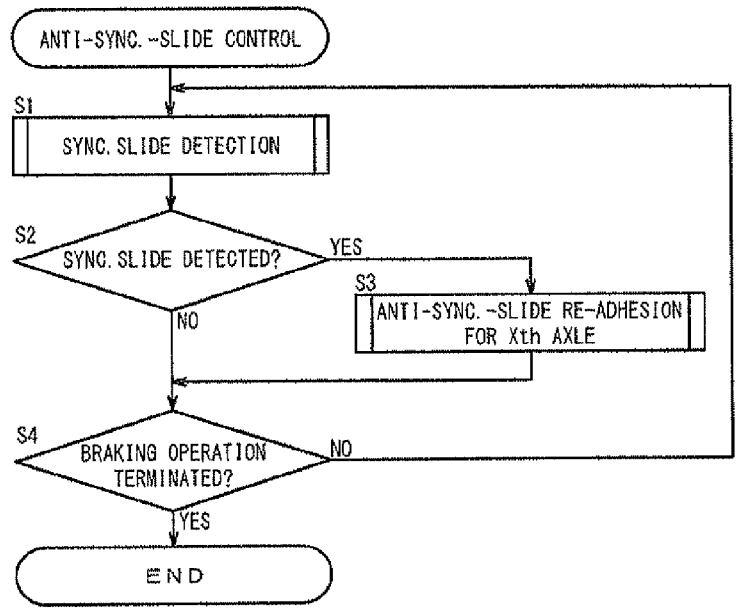
FIG. 3 is a flow chart showing an anti-synchronous-slide control at braking of the railcar in FIG. 1.

FIG. 3 shows a program flow of the anti-synchronous-slide control by the main controller 1 which is performed at the braking operations of the cars 2 and 3. In this control, the synchronous slide detector 23 determines at step S1 whether all the axles 6 are sliding to a certain extent or more in substantially the same manner, which is referred to as "synchronous slide" in this application. Then, a determination is made at step S2 whether the synchronous slide is detected at step S1. If the determination is true, the program proceeds to step S3 where the anti-synchronous-slide re-adhesion controller 27 performs the anti-synchronous-slide re-adhesion control to terminate the sliding of the specific X-th axle 6.

If the determination is false or if the anti-synchronous-slide re-adhesion control is terminated, the program proceeds to step S4 where a determination is made whether the braking operation is terminated. If the determination is false, the program returns to step S1 to perform the above-described operations. If the determination is true, the anti-synchronous-slide control is terminated.

Although the anti-synchronous-slide re-adhesion control is made only to the specific x-th axle 6 at step S3 in the embodiment, it may be made to a plurality of or all of the axles.

Figure 4:
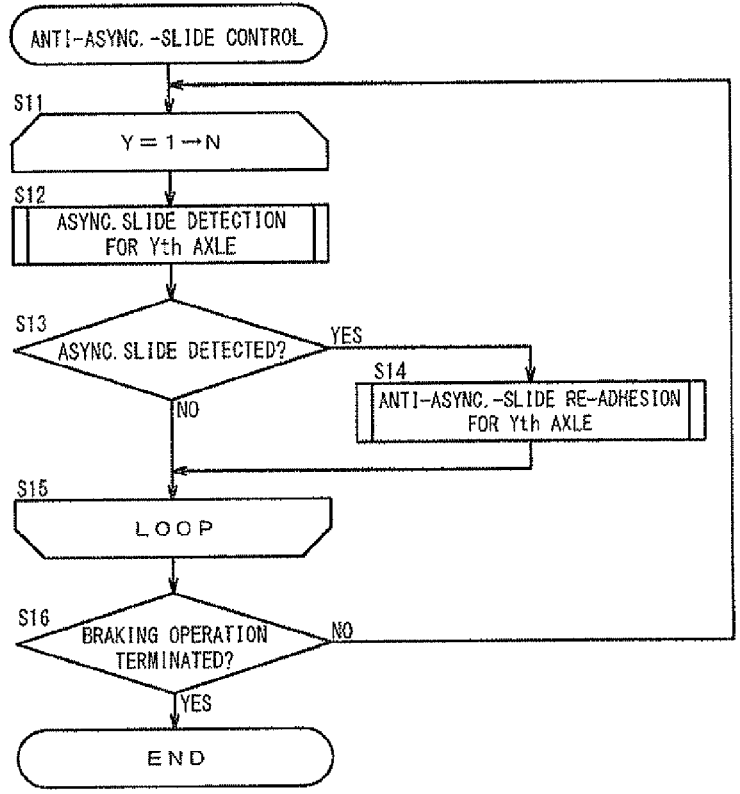
FIG. 4 is flow chart showing an anti-asynchronous-slide control at braking of the railcar in FIG. 1.

FIG. 4 shows a program flow for the anti-asynchronous-slide control which is performed simultaneously with the anti-synchronous-slide control in FIG. 3 at the braking operations for the cars 2 and 3. According to the anti-asynchronous-slide control, a loop parameter Y is incremented at step S11 in order to perform the anti-asynchronous-slide re-adhesion control for all of N axles in series. Then, the asynchronous slide detector 25 performs at step S12 a conventional operation to determine whether the Y-th axle is asynchronously sliding.

Next, a determination is made at step S13 whether the asynchronous slide is detected. If the determination is true, the program proceeds to step S14 where the anti-asynchronous-slide re-adhesion controller 29 performs the anti-asynchronous-slide re-adhesion control to terminate the asynchronous sliding of the axle 6. In this embodiment, the anti-asynchronous-slide re-adhesion control is performed in a manner similar to the conventional re-adhesion control. If the determination is false or the anti-asynchronous-slide re-adhesion control is terminated, the program proceeds to the end of the loop, i.e., step S15.

Before the loop parameter reaches up to N, the program flows back from S15 to step S11 to perform the above-described processes for all the axles 6. If the above-processes are completed for all the axles 6, a determination is made at step S16 whether the braking operation is still being performed. If the determination is false, the program returns to step S11 to perform the above-described loop processes for the next axle. If the determination is true, the anti-asynchronous-slide control is terminated.

Figure 5:
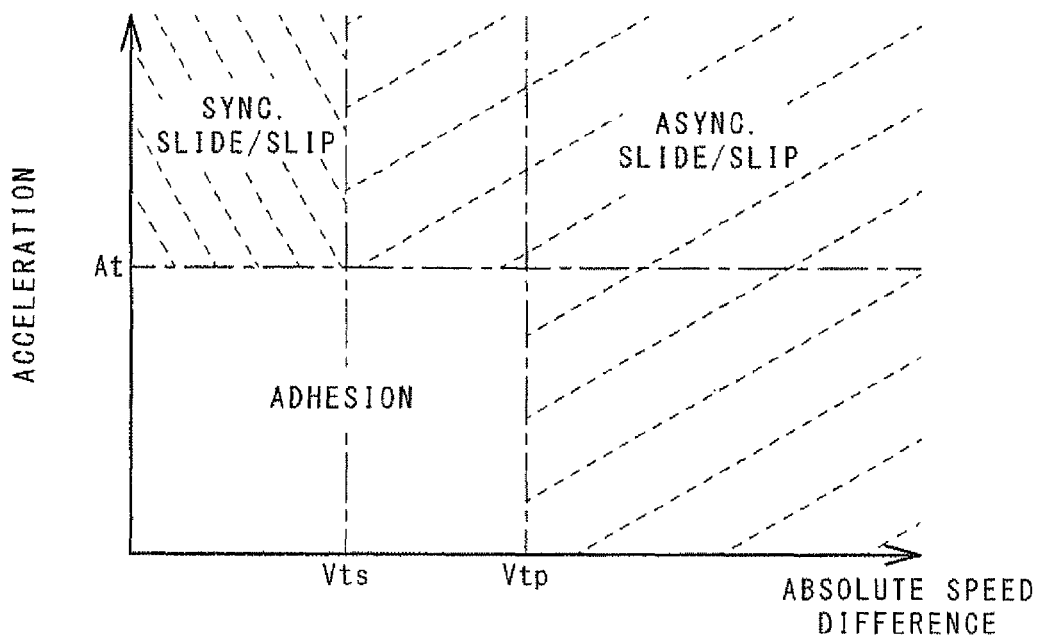
FIG. 5 is a speed difference versus acceleration relationship showing regions for use in slide/slip determinations for the railcar in FIG. 1.

FIG. 5 shows a graph showing criteria used for determining whether the wheels are synchronously or asynchronously sliding/slipping. In this graph, the horizontal axis indicates an absolute value of speed difference and the vertical axis indicates an absolute value of acceleration. For the synchronous slide/slip detection, an absolute maximum value of speed difference among axles 6 or an absolute maximum value of speed difference between a reference speed obtained by correcting the speed of the fastest axle and respective speeds of the axles is provided for the horizontal axis and an absolute value of acceleration of the axle with the greatest acceleration is provided for the vertical axis. For the asynchronous slide/slip detection, an absolute speed difference between the reference speed and the speed of the axle being considered is provided for the horizontal axis and an absolute value of acceleration of the axle is provided for the vertical axis.

The graph in FIG. 5 is also used for the anti-slip control at the power running which will be described later. As is known in the art, the acceleration at the power running acts in a direction opposite to that at the braking. Therefore, absolute values of the speed difference and the acceleration are used in the graph, which allows the graph to be used for both anti-slide and anti-slip controls.

For the determination of the synchronous or asynchronous slide/slip, a plurality of references or thresholds are used. In the embodiment, the same acceleration threshold At is used for the synchronous and asynchronous sliding/slipping controls. Also, the synchronous sliding/slipping speed difference threshold Vts is used for the determination of the synchronous sliding/slipping and the asynchronous sliding/slipping speed difference threshold Vtp (>Vts) is used for the determination of the asynchronous sliding/slipping. The thresholds may be determined from computer simulations and/or field tests. The reference speed may be determined in a conventional manner in which speed signals unlikely to occur are omitted.

Using the graph, in the synchronous slide/slip detection all of the axles 6 are determined to be synchronously sliding/slipping if the absolute maximum value of speed difference is less than the threshold Vts and the absolute value of acceleration is greater than the acceleration threshold At.

Also, in the asynchronous slide/slip detection the axle 6 being considered is determined to be asynchronously sliding/slipping if the absolute maximum value of speed difference between the speed reference and the speed of that axle is greater than the threshold Vtp, or if the absolute speed difference ranges between two speed thresholds Vts and Vtp and the absolute acceleration is greater than the acceleration threshold At.

Further, the absolute maximum value of speed difference detected for each of the axles 6 is equal to or less than the speed difference threshold Vtp and the absolute value of acceleration detected for each axle is equal to or less than the acceleration threshold At, each axle is determined to remain substantially in the state of adhesion free from sliding/slipping.

Figure 6:
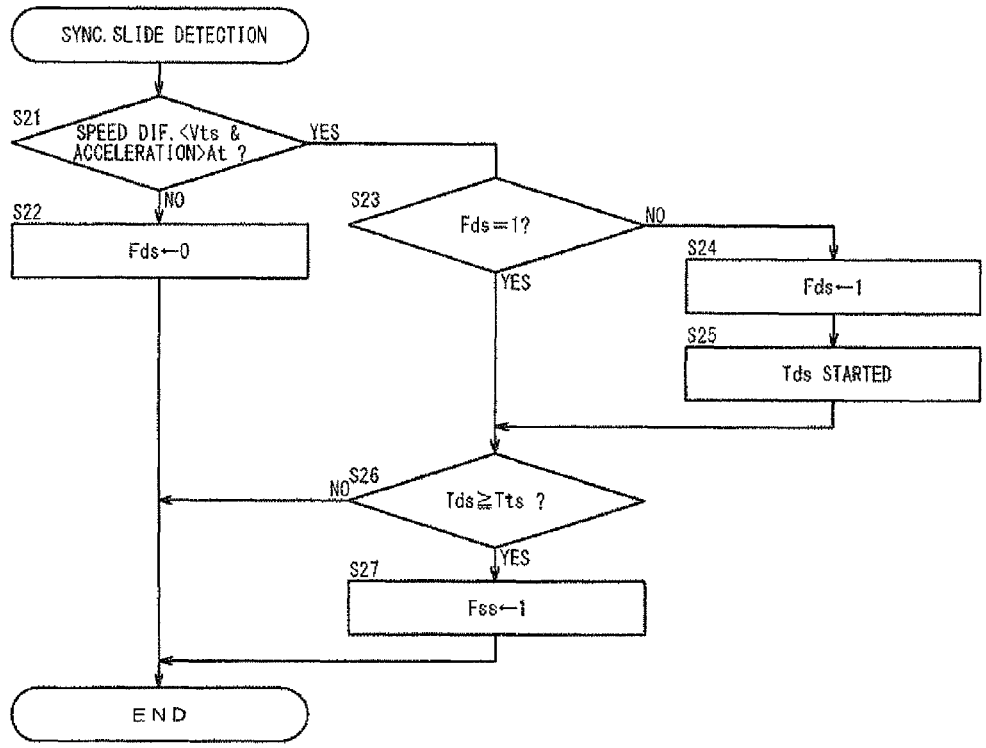
FIG. 6 is a flow chart showing a synchronous slide detection control in FIG. 3.

FIG. 6 shows a detailed program flow of the synchronous slide detection control at step S1 in FIG. 3, which is performed by the synchronous-slide detector 23. In this control, a determination is made at step S21 whether the absolute maximum value of speed difference is less than the speed difference threshold Vts and the absolute value of acceleration is greater than the acceleration threshold At, i.e., whether the detected data is within the synchronous slide/slip region. If the determination is false, the program proceeds to step S22 where a flag Fds which indicates that the synchronous slide is detected is set to be "0 (false)" and the synchronous-slide detection is terminated.

If the detected data is within the synchronous slide/slip region, a determination is made at step S23 whether the synchronous slide detect flag Fds is "0 (false)" or "1 (true)". If the synchronous slide flag Fds is "0 (false)", it is changed to be "1 (true)" at step S24 and then a synchronous slide/slip detect timer Tds is started at step S25.

If a determination is made at step S23 that the synchronous slide detect flag Fds is "1 (true)" or if the processes at steps 24 and at step 25 are completed, the program proceeds to step S26 where a determination is made whether the timer Tds is counting. If the counter value of the timer Tds is equal to or greater than the preset timer threshold Tts for the determination of synchronous slide, a synchronous slide flag Fss is set to be "1 (true)" at step S27 which indicates that all the axles are detected to be in the state of synchronous slide and the synchronous slide detection is terminated. If the counter value of the timer Tds is less than the preset timer threshold Tts, the synchronous slide flag Fss remains unchanged and then the synchronous slide detection is terminated.

In this embodiment, the synchronous slide detection control of step S1 is repeated a plurality of times to determine that all of the axles are in the state of synchronous slide as long as the detected speed and acceleration data remains in the synchronous slide/slip region for the time defined by the synchronous slide timer threshold Tts.

Figure 7:
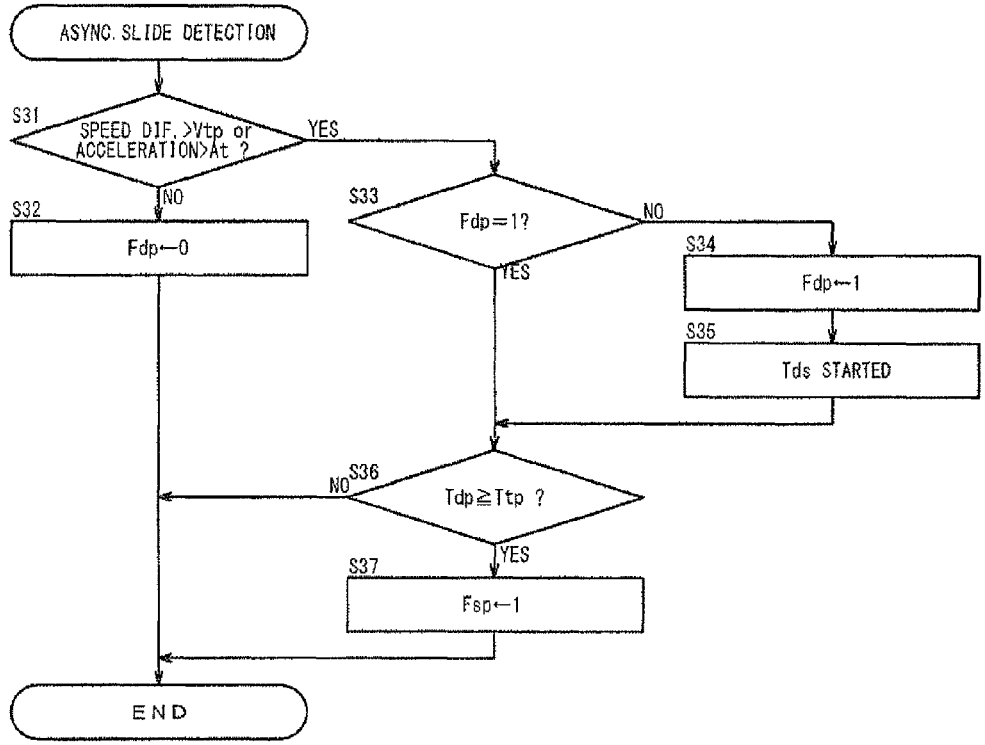
FIG. 7 is a flow chart showing an asynchronous slide detection control in FIG. 3.

FIG. 7 shows a detailed flow of the asynchronous slide detection control at step S12 in FIG. 4, which is performed by the asynchronous slide detector 25. In this control, a determination is made at step S31 whether the maximum value of speed differences is greater than the speed difference threshold Vtp or the maximum value of acceleration is greater than the threshold At, i.e., whether the detected data is within the synchronous or asynchronous slide/slip region. If the determination is false, the program proceeds to step S32 where an asynchronous slide flag Fds is set to be "0 (false)" and the asynchronous slide detection control is terminated.

If the detected data is in the synchronous or asynchronous region, a determination is made at step S33 whether an asynchronous slide flag Fdp is "0 (false)" or "1 (true)". If the flag Fdp is "0 (false)" it is changed to be "1 (true)" and then the asynchronous detection timer Tdp is started at step S35.

If it is determined that the Flag Fdp is "1 (true)" at step S33 or the processes at steps 34 and 35 are completed, the program proceeds to step S36 to determine whether a counter value of the timer Tdp is equal to or greater than the preset asynchronous slide detection threshold Ttp. If the determination is true, the asynchronous slide/slip flag Fsp is set to be "1 (true)" at step S37 which indicates that the axles are in the synchronous or asynchronous slide state and the asynchronous slide detection control is terminated. If the counter value of the timer Tdp is less than the preset asynchronous slide detection threshold Ttp, the asynchronous slide detect flag Fsp remains unchanged and the asynchronous slide detection control is terminated.

Figure 8:
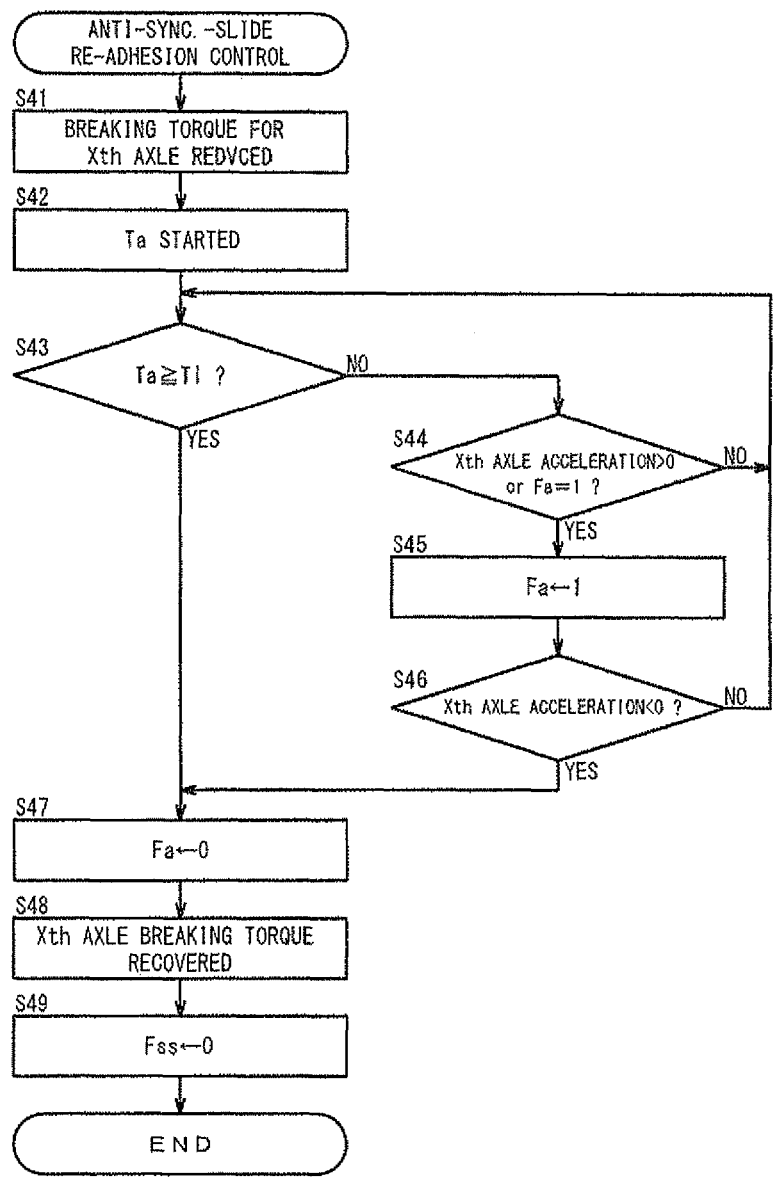
FIG. 8 is a flow chart showing an anti-synchronous-slide re-adhesion control in FIG. 3.

FIG. 8 shows a detailed program flow of the anti-synchronous-slide re-adhesion control at step S3 in FIG. 3, which is performed by the anti-synchronous-slide re-adhesion controller 27. In this control, the main controller 1 transmits a command signal to the motor controller 10 and the brake controller 11 of the X-th axle to which this control will be applied to reduce the braking torque to zero. Preferably, the axle 6 to be controlled is the one of which sliding can be thought to be removed relatively quickly and thereby to improve the effectiveness of the anti-asynchronous-slide re-adhesion control. Preferably, the axle of which the breaking torque will be adjusted is the one which is thought to be less likely to slide, e.g., the rearmost axle, or the one having the maximum speed. The breaking torque needs not to be eliminated completely. Alternatively, the breaking torque may be reduced to be a predetermined sufficiently small value.

Next, an adhesion timer Ta is started at step S42 and then a determination is made at step S43 whether a counter value of the adhesion timer Ta is equal to or greater than a predetermined threshold T1. If the determination is false, a determination is made at step S44 whether the acceleration of the X-th axle 6 takes positive value or a re-adhesion flag Fa is "1 (true)". If the acceleration of the X-th axle 6 does not take positive value and the re-adhesion flag Fa is "0 (false)", the program returns to step S43. If the acceleration takes positive value or the re-adhesion flag Fa is "1 (true)", the program proceeds to step S45 where the re-adhesion flag Fa is set to "1 (true)" and the program proceeds to step S46 where a determination is made whether the acceleration of the x-th axle takes negative value and, if the value is positive, the program returns to step S43.

If it is determined at step S43 that the counter of the adhesion timer Ta is equal to or more than the time limit T1 or the it is determined at step S46 that the acceleration of the X-th axle is negative, the program flows through steps S47 and S49 and then terminates the anti-synchronous-slide re-adhesion control. At step S47, the re-adhesion flag Fa is set to be "0 (false)" (re-adhesion determining section 31). Next, at step S48 an command signal is transmitted to the motor controller 10 and/or the brake controllers 11 so that the motor and/or brake generates a braking torque which corresponds to the input from the operation desk. Finally, at step S49 the synchronous slide flag Fss is set to be "0 (false)"

In the anti-synchronous-slide re-adhesion control, in particular at steps S44 to S46 made by the re-adhesion determining section 31 determines whether the axle being considered has recovered its adhesion. Before describing the re-adhesion control, discussions will be made to how the speed, acceleration, and braking torque of the axle under braking will change with reference to FIGS. 9A-9C. In this drawing, the car translational speed is indicated by a thin solid line. The rotational speed of the axle 6, which is indicated by thick solid line, is represented as the peripheral speed of the associated wheel 5.

Figure 9A:
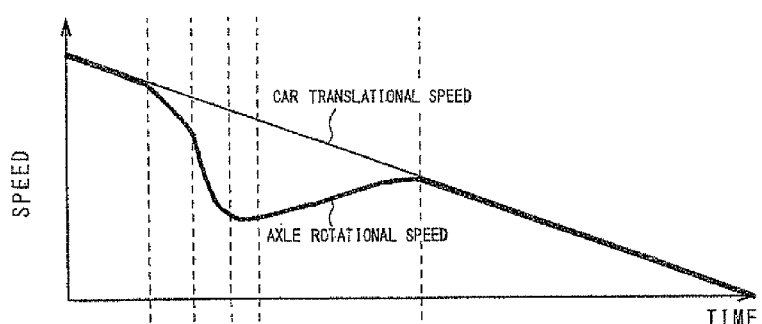
FIGS. 9A-9C are graphs showing time versus axle's speed, acceleration, and breaking torque relationships during the anti-synchronous-slide re-adhesion control in FIG. 7.
Figure 9B:
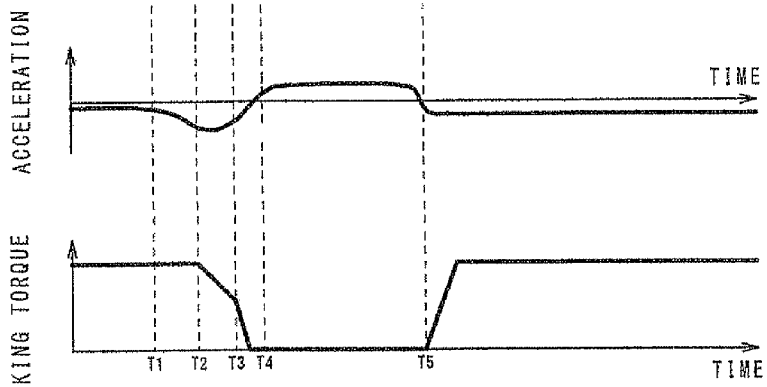
Figure 9C:
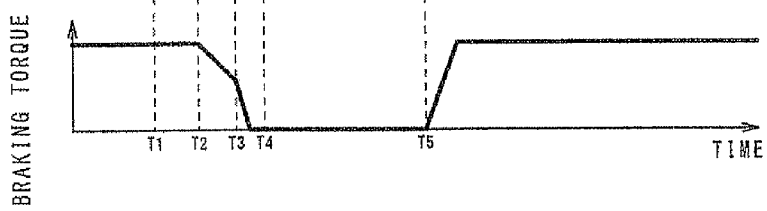

As shown in FIGS. 9A-9C, if the axle 6 begins to slide at time T1, the peripheral speed of the associated wheel becomes lower than the translational speed of the car. With the increase of the slide, the acceleration decreases correspondingly so that the axle 6 reaches its adhesion limit at time T2. Then, when the counter value of the synchronous slide detection timer Tds reaches the synchronous slide detection timer threshold Tts, which is determined at step S26, the braking torque is removed from the axle 6 at time T3, which allows the frictional force between the wheel and the rail to accelerate the wheel and the associated axle. Then, the accelerating of the axle begins to take the positive value at time T4, which is determined at step S44. Further, when the peripheral speed of the wheel on the associated axle reaches the translational speed of the car, the speed of the axle decreases with the translational speed of the car due to the re-adhesion of the associated wheel onto the rail. Then, when the acceleration of the axle begins to take negative value at time T5, which is determined at step S46, the braking torque is recovered so that the axle begins to assist the braking of the car.

During a period from time T3 to time T4, it is determined at step S44 that the re-adhesion flag Fa remains "0 (false)" and the acceleration takes negative value and, as a result, the program does not proceed to step S45 during a period from time T3 to time T4. Then, if it is determined at time T4 that the acceleration takes positive value, the program proceeds step S45 where the re-adhesion flag Fa is set to be "1 (true)" which indicates the re-adhesion is being established between the associated wheel and the rail. Afterwards, the program returns to step S43 and then step S44 until it is determined at step S46 that the acceleration takes negative value again. If it is determined at step S44 that the re-adhesion flag Fa is "1 (true)", the program flows through step S45 to step S46 where it is determined whether the acceleration again takes negative value. If it is determined at step S46 that the acceleration again takes negative value at time T5, the program proceeds to step S47 where the re-adhesion flag Fa is set to be "0 (false)" which means that the re-adhesion is terminated.

As described above, the step S43 in FIG. 8 checks the counter value of the re-adhesion timer Ta, and the anti-synchronous-slide re-adhesion control is determined to be terminated after the elapse of the predetermined adhesion limit time T1 for the anti-synchronous-slide re-adhesion control even if no re-adhesion has been detected. The reason behind taking such process is that it is preferable that the program returns back to the control of FIG. 3, in view of likelihood that the re-adhesion may not be detected due to, for example, noises in the speed detector or pulse generator 9 and possible rapid changes in the adhesion characteristics and/or rail gradient. This results in that, according to the control indicated in FIG. 3, the anti-synchronous-slide re-adhesion control is started again when the synchronous slide is detected for the same axle 6 in synchronous slide detection control. In this instance, the anti-synchronous-slide re-adhesion control may be made to another axle, not limited to the same axle. The axle to be controlled may be indicated on the operation desk 4.

FIG. 10 shows a detail program flow of the anti-asynchronous-slide re-adhesion control at step S14 in FIG. 4, which is performed by the anti-asynchronous-slide re-adhesion controller 29. In this control, an input signal to the motor controller 10 or brake controller 11 associated with the Y-th axle to be controlled is set at step S51 so that the braking torque of the axle of which the asynchronous slide has been detected most recently will correspond to that obtained by multiplying a torque calculated from the input on the operation desk 4 by a ratio of the rotational speed of the axle to the reference speed.

The detection of the synchronous slide in the synchronous slide detection control can be occurred simultaneously with the detection of the asynchronous slide of the X-th axle in the asynchronous slide detection control. In this instance, for the X-th axle, the anti-synchronous-slide re-adhesion control of FIG. 8 is preferentially performed rather than the anti-asynchronous-slide re-adhesion control.

Then, a determination is made at step S52 whether the difference between the rotational speed of the axle being controlled and the reference speed is less than the threshold Vtp and whether the acceleration of the axle is less than the acceleration threshold At. If it is determined that the speed difference is less than Vtp and the acceleration is less than At, i.e., the speed difference and the acceleration are both within the adhesion region in FIG. 5, the program proceeds to step S53. Otherwise, the program returns to step S51 to reset the braking torque. The step S52 is performed by the re-adhesion determination section 33 in FIG. 2. Then, at step S53 the braking torque is set to be that used for the normal control and determined according to the input from the operation desk 4. Also, the asynchronous slide flag Fsp is set back to be "0 (false)" and the anti-asynchronous-slide re-adhesion control is terminated.

Figure 11A:
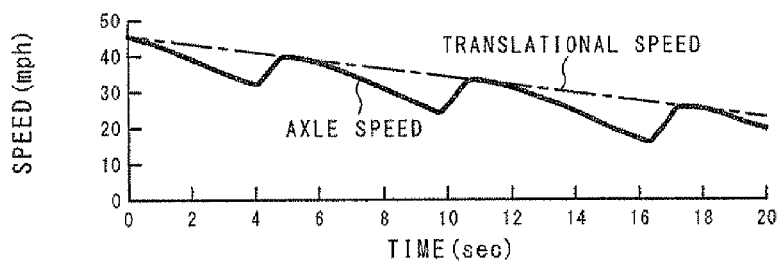
FIGS. 11A-11C are graphs showing time versus speed, acceleration, and breaking torque relationships during the anti-synchronous-slide control in FIG. 3.
Figure 11B:
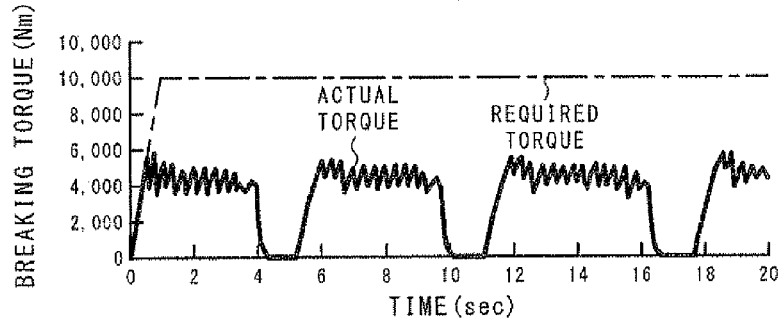
Figure 11C:
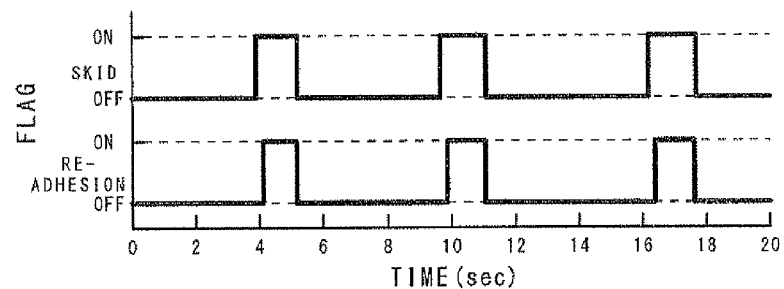

FIG. 11 shows a simulation result of the above-described sliding controls. The illustrated data is obtained under the condition in which the friction between the wheels and rails was assumed to be relatively low. The required torque indicated in FIG. 11B is obtained by equally dividing a breaking torque which would be required for controlling the translational speed of the cars with a desired speed reduction ratio by the number of all the axles. The actual torque is that borne by each axle, i.e., the braking torque exerted on the axle being controlled.

According to the embodiment, when the synchronous slide detection control detects the synchronous slide, the rotational speed of one axle is adjusted by the anti-synchronous-slide re-adhesion control so that it becomes to the translational speed of the car, which results in that the speed differences between the controlled and non-controlled axles become larger. This means that the anti-synchronous-slide re-adhesion control causes the rotational speed of the axle with the minimum slide (which is used as a reference in the asynchronous slide detection and anti-asynchronous-slide re-adhesion control) to be the same as the translational speed of the car and thereby improves the slide reduction efficiency by the anti-asynchronous-slide re-adhesion control.

Figure 12:
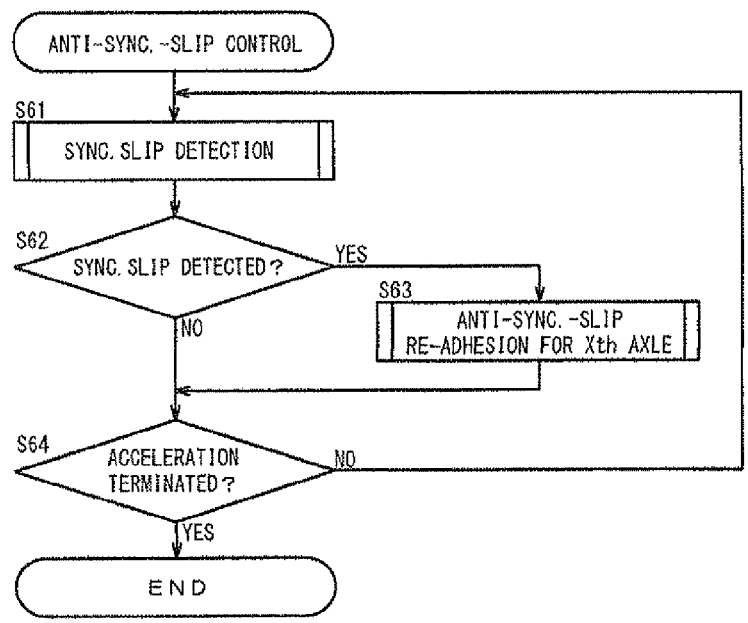
FIG. 12 is a flow chart showing an anti-synchronous-slip control at power running of the railcar.

FIG. 12 shows a program flow of the anti-synchronous-slip control for reducing the synchronous slip of the axles at the power running for accelerating the cars 2 and 3. The anti-synchronous-slip control is substantially similar to the anti-synchronous-slide control described with reference to FIGS. 3, 6 and 8 except that the acceleration acts in the opposite direction.

A general discussion will be made to the program flow of the anti-synchronous-slip control. At first, the synchronous-slip detector 24 determines at step S61 whether the axles 6 are synchronously slipping to a certain extent or more in substantially the same manner. This control is applied only to the axles drivingly connected to respective motors so that the power running torque is applied thereto from the motors. This is because the slipping occurs only in the axles to which the acceleration torque is applied.

Then, a determination is made at step S62 whether the synchronous slip has been detected. If the determination is true, the program proceeds to step S63 where the anti-synchronous-slip re-adhesion control is performed by the anti-synchronous-slip re-adhesion controller 28 to terminate the slipping of at least one of the axles. Although the re-adhesion control is applied only to the X-th axle in this embodiment, it may be applied to some or all of axles drivingly connected to respective motors 7.

If no synchronous slip is detected or the anti-synchronous-slip control is terminated, the program proceeds to step S64 where a determination is made whether the power running is maintained. If it is determined at step S64 that the power running is being performed, the program returns to step S61 to repeat the above described processes. Otherwise, the anti-synchronous-slip control is terminated.

Figure 13:
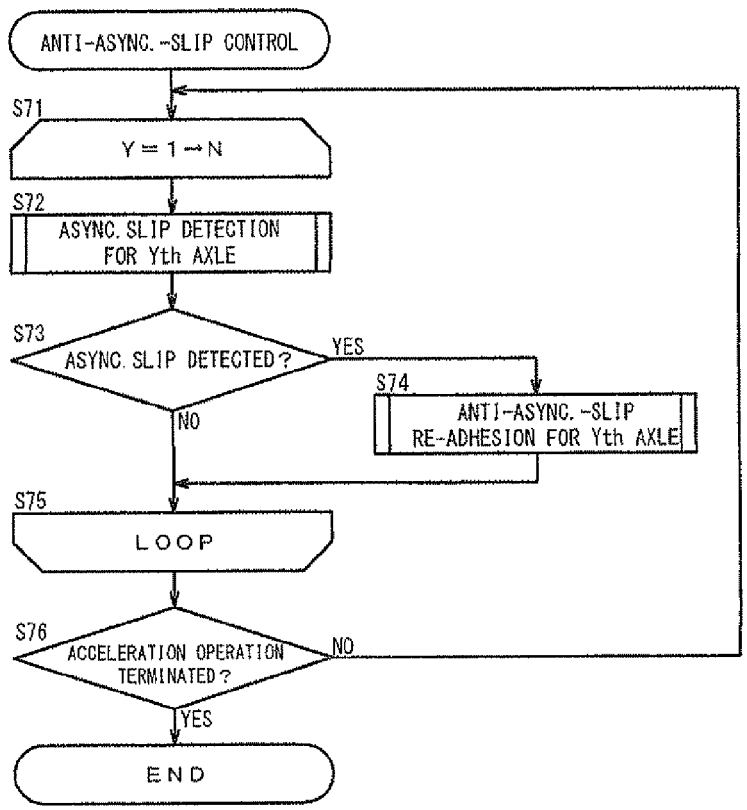
FIG. 13 is a flow chart showing an anti-asynchronous-slip control at power running of the railcar.

FIG. 13 shows a program flow of the anti-asynchronous-slip control which is performed simultaneously with the anti-synchronous-slip control. The anti-asynchronous-slip control is substantially the same as the anti-asynchronous-slide control described with reference to FIGS. 4, 7 and 10 except that the acceleration acts in the opposite direction. In the anti-asynchronous-slip control, a loop parameter Y is incremented at step S71 which is used for control all the axles 6 in series. Then, an asynchronous slip detection control is performed at step S72 to determine whether the Y-th axle is in the state of asynchronous slip in the conventional manner.

Next, a determination is made at step S73 whether the asynchronous slip is detected for the Y-th axle. If the determination is true, the program proceeds to step S74 where the anti-asynchronous-slip re-adhesion control is performed by the anti-asynchronous-slip re-adhesion controller 30 to eliminate or reduce the slipping of that axle. The conventional anti-asynchronous slip re-adhesion control may be used in this embodiment. If the determination is false, the program proceeds to step S75.

The step S75 returns the program to step S71 until the above-described processes are performed for all the axles, i.e., the loop parameter Y reaches to N. If completed, a determination is made at step S76 whether the power running is terminated. If the determination is false, the program returns to step S71. Otherwise, the anti-asynchronous-slip control is terminated.

Although the asynchronous slip detection control is performed for the axles with respective motors in the embodiment, it may be made for the axle free from motor. In this instance, the reference speed may be the same as the translational speed.

Figure 14A:
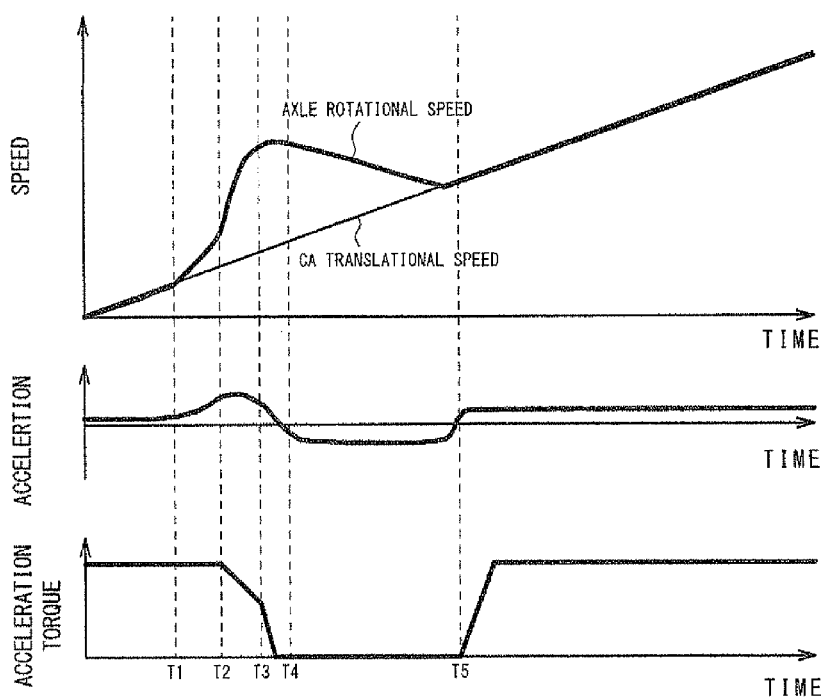
FIGS. 14A-14C are graphs showing time versus axle's speed, acceleration, and breaking torque relationships during an anti-synchronous-slip re-adhesion control in FIG. 12.
Figure 14B:
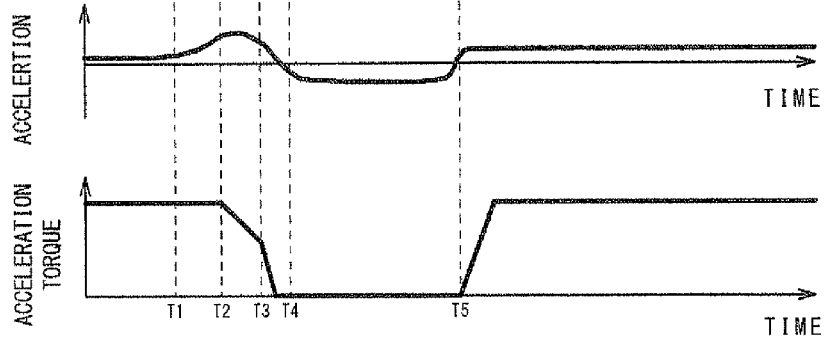
Figure 14C:
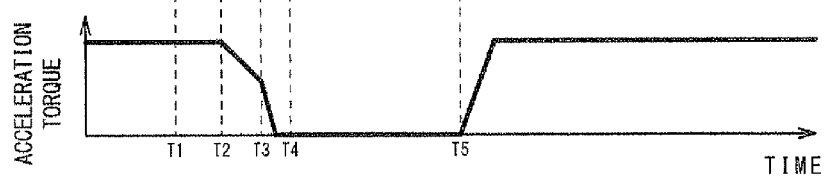

FIGS. 14A-14C schematically show speed, acceleration, and torque variations of the axle under power running. As shown, the minimum speed of the axle is considered to be close to the translational speed of the car, so that the critical axle to be controlled is the one with the maximum speed. Also, it should be noted that the speed difference and acceleration thresholds, used in respective steps corresponding to the steps S44 and S46, take respective values with opposite polarities. For example, the re-adhesion is determined to be completed when the acceleration of the axle from during the acceleration torque has been reduced changes from negative to positive value.

As described above, this embodiment uses additional speed difference threshold Vts which is smaller than the speed difference threshold Vtp to determine that, where the acceleration is greater than At, all of the axles are synchronously sliding/slipping or one or more of the axles are asynchronously sliding/slipping using the threshold Vts.

This allows the braking or acceleration torque in the anti-synchronous-slide/slip re-adhesion control to be smaller than that in the anti-asynchronous-slide/slip re-adhesion control, which requires less time for the anti-synchronous-slide/slip re-adhesion control. The time may be more reduced by applying the anti-synchronous-slide/slip re-adhesion control to the axles which are less likely to slide or slip, with an interaction with the conventional asynchronous slide/slip re-adhesion control.

Although the same thresholds Vts, Vtp, and At are commonly used for the anti-slide and anti-slip controls in the previous embodiment, the thresholds Vts, Vtp, and At for the anti-slide control may be different from those for the anti-slip control.

Also the acceleration threshold At for the synchronous slide detection may differ from that for the asynchronous slip detection.

The above-descriptions include various embodiments of the railcar control apparatus for anti-slide and/or anti-slip control and of methods for detecting synchronous slide and asynchronous slip.

PARTS LIST

1: main controller (railcar control apparatus)
2: leading (control) car
3: trailing (controlled) car
4: operation desk
5: wheel
6: axle
7: motor
8: pulse generator
9: brake
10: motor controller
11: brake controller
23: synchronous slide detector
24: synchronous slip detector
25: asynchronous slide detector
26: asynchronous slip detector
27: anti-synchronous-slide re-adhesion controller
28: anti-synchronous-slip re-adhesion controller
29: anti-asynchronous-slide re-adhesion controller
30: anti-asynchronous-slip re-adhesion controller
31: re-adhesion determining section
32: re-adhesion determining section

What is claimed is:

1. An apparatus for controlling a railcar, comprising
a synchronous slide detector which is adapted to detect a synchronous slide in which all of axles being controlled synchronously slide at a braking operation of the railcar if an absolute value of speed difference of all of the sliding axles being controlled is less than a synchronous slide speed difference threshold and an absolute value of an axle's negative acceleration value is greater than a synchronous slide acceleration threshold; and
an asynchronous slide detector which is adapted to detect an asynchronous slide in which some or all of the axles asynchronously slide at the braking operation of the railcar if the absolute value of speed difference of the sliding axles is greater than an asynchronous slide speed difference threshold or the absolute value of an axle's negative acceleration value is greater than an asynchronous slide acceleration threshold, wherein the asynchronous slide speed difference threshold is greater than the synchronous slide speed difference threshold.

2. The apparatus of claim 1, further comprising an anti-asynchronous-slide re-adhesion controller which is adapted to reduce a braking torque of the axle which is detected to be asynchronously sliding.

3. The apparatus of claim 1, further comprising
an anti-synchronous-slide re-adhesion controller which is adapted to perform an anti-synchronous-slide re-adhesion control for eliminating a braking torque applied to at least one of the axles or reducing the braking torque to a predetermined value.

4. The apparatus of claim 3, wherein the anti-synchronous-slide re-adhesion controller is adapted to control the torque applied to the rearmost axle.

5. The apparatus of claim 3, wherein the anti-synchronous-slide re-adhesion controller includes a re-adhesion determining section which is adapted to determine a termination of slide re-adhesion when an acceleration of the axle of which the braking torque is being reduced changes from positive to negative.

6. An apparatus for controlling a railcar, comprising
a synchronous slip detector which is adapted to detect a synchronous slip in which all axles being controlled synchronously slips at an accelerating operation of the railcar if an absolute value of speed difference of all of the slipping axles being controlled is less than a synchronous slip speed difference threshold and an absolute value of an axle's positive acceleration value is greater than a synchronous slip acceleration threshold; and
an asynchronous slip detector which is adapted to detect an asynchronous slip in which some or all of the axles are asynchronously slipping at the accelerating operation of the railcar if the absolute value of speed difference of the slipping axles is greater than an asynchronous slip speed difference threshold or the absolute value of an axle's positive acceleration value is greater than an asynchronous slip acceleration threshold, wherein the asynchronous slip speed difference threshold is greater than the synchronous slip speed difference threshold.

7. The apparatus of claim 6, further comprising
an anti-asynchronous-slip re-adhesion controller which is adapted to reduce an acceleration torque of the axle which is detected to be asynchronously slipping.

8. The apparatus of claim 6, further comprising
an anti-synchronous-slip re-adhesion controller which is adapted to perform an anti-synchronous-slip re-adhesion control for eliminating an acceleration torque applied to at least one of the axles or reducing the acceleration torque to a predetermined value.

9. The apparatus of claim 8, wherein the anti-synchronous-slip re-adhesion controller is adapted to control the torque applied to the rearmost axle.

10. The apparatus of claim 8, wherein the anti-synchronous-slip re-adhesion controller includes a re-adhesion determining section which is adapted to determine a termination of slip re-adhesion when the acceleration of the axle of which the acceleration torque is being reduced changes from negative to positive.

11. An apparatus for controlling a railcar, comprising
a synchronous slide detector which is adapted to detect a synchronous slide in which all axles being controlled synchronously slide at a braking operation of the railcar if an absolute value of speed difference of all of the sliding axles being controlled is less than a synchronous slide speed difference threshold and an absolute value of an axle's negative acceleration value is greater than a synchronous slide acceleration threshold; and
an anti-synchronous-slide re-adhesion controller which is adapted to perform an anti-synchronous-slide re-adhesion control for eliminating a braking torque applied to at least one of the axles or reducing the braking torque to a predetermined value.

12. The apparatus of claim 11, wherein the anti-synchronous-slide re-adhesion controller is adapted to control the torque applied to the rearmost axle.

13. The apparatus of claim 11, wherein the anti-synchronous-slide re-adhesion controller includes a re-adhesion determining section which is adapted to determine a termination of slide re-adhesion when an acceleration of the axle of which the braking torque is being reduced changes from positive to negative.

14. An apparatus for controlling a railcar, comprising
a synchronous slip detector which is adapted to detect a synchronous slip in which all axles being controlled synchronously slips at an accelerating operation of the railcar if an absolute value of speed difference of all of the slipping axles being controlled is less than a synchronous slip speed difference threshold and an absolute value of an axle's positive acceleration value is greater than a synchronous slip acceleration threshold; and
an anti-synchronous-slip re-adhesion controller which is adapted to perform an anti-synchronous-slip re-adhesion control for eliminating an acceleration torque applied to at least one of the axles or reducing the acceleration torque to a predetermined value.

15. The apparatus of claim 14, wherein the anti-synchronous-slip re-adhesion controller is adapted to control the torque applied to the rearmost axle.

16. The apparatus of claim 14, wherein the anti-synchronous-slip re-adhesion controller includes a re-adhesion determining section which is adapted to determine a termination of slip re-adhesion when the acceleration of the axle of which the acceleration torque is being reduced changes from negative to positive.

* * * * *